United States Patent [19]

Hwang et al.

[11] Patent Number: 5,778,112
[45] Date of Patent: Jul. 7, 1998

[54] WAVEGUIDE POLYMER ELECTRO-OPTIC MODULATOR/SWITCH

[75] Inventors: Wol-Yon Hwang; Jang-Joo Kim, both of Daejeon, Rep. of Korea

[73] Assignee: Electronics and Telecommunications Research Institute, Daejeon, Rep. of Korea

[21] Appl. No.: 721,733

[22] Filed: Sep. 27, 1996

[30] Foreign Application Priority Data

Dec. 21, 1995 [KR] Rep. of Korea ............ 95-53638

[51] Int. Cl.⁶ .................................................. G02F 1/035
[52] U.S. Cl. ...................... 385/2; 385/1; 385/8; 385/9; 385/15; 385/16; 385/28; 385/39; 385/40; 385/131
[58] Field of Search ........................... 385/1, 2, 8, 9, 385/15, 16, 27, 28, 39, 40, 130, 131

[56] References Cited

U.S. PATENT DOCUMENTS

| | | | |
|---|---|---|---|
| 4,932,738 | 6/1990 | Haas et al. | 385/2 |
| 4,936,645 | 6/1990 | Yoon et al. | 385/2 |
| 5,007,696 | 4/1991 | Thackara et al. | 385/2 |
| 5,061,028 | 10/1991 | Khanarian et al. | 385/132 |
| 5,155,620 | 10/1992 | Gordon et al. | 385/2 |
| 5,402,514 | 3/1995 | Booth et al. | 385/130 |
| 5,513,283 | 4/1996 | Whang et al. | 385/8 |
| 5,555,326 | 9/1996 | Hwang et al. | 385/2 |

*Primary Examiner*—Brian Healy
*Attorney, Agent, or Firm*—Antonelli, Terry, Stout & Kraus, LLP

[57] ABSTRACT

An improved waveguide polymer electro-optic modulator/switch which is operated in a single mode and has an improved device characteristic compared to the optimized modulator/switch and is capable of enhancing a coupling efficiency with an optical fiber without an increase of the driving voltage, which includes a waveguide formed in one line, a signal electrode formed at an upped input side of the waveguide, to which signal electrode a signal voltage is applied as an upper electrode, and an absorption electrode formed at an upper portion of the waveguide for absorbing a higher order which are not easily absorbed by the signal electrode and for increasing a dissipation ratio.

3 Claims, 6 Drawing Sheets

WAVEGUIDE POLYMER ELECTRO-OPTIC MODULATOR/SWITCH

BACKGROUND OF THE INVENTION

1. Field of the Invention

The present invention relates to a waveguide polymer electro-optic modulator/switch, and particularly, to an improved waveguide polymer electro-optic modulator/switch which is capable of improving a driving voltage and a dissipation ratio of a device by increasing the coupling efficiency of a basic mode of a beam incident on a waveguide polymer.

2. Description of the Conventional Art

Figure 1A:
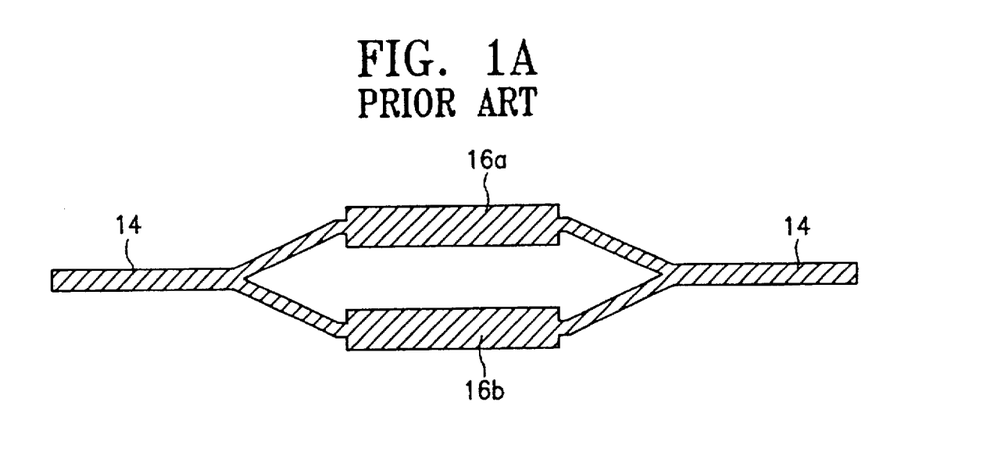
FIG. 1A is a planar view of a Mach-Zehnder interference system in the conventional art.
Figure 1B:
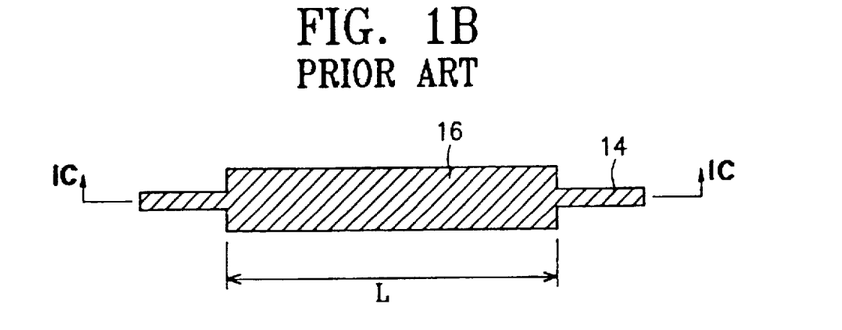
FIG. 1B is a planar view of a phase modulator according to conventional are.
Figure 1C:
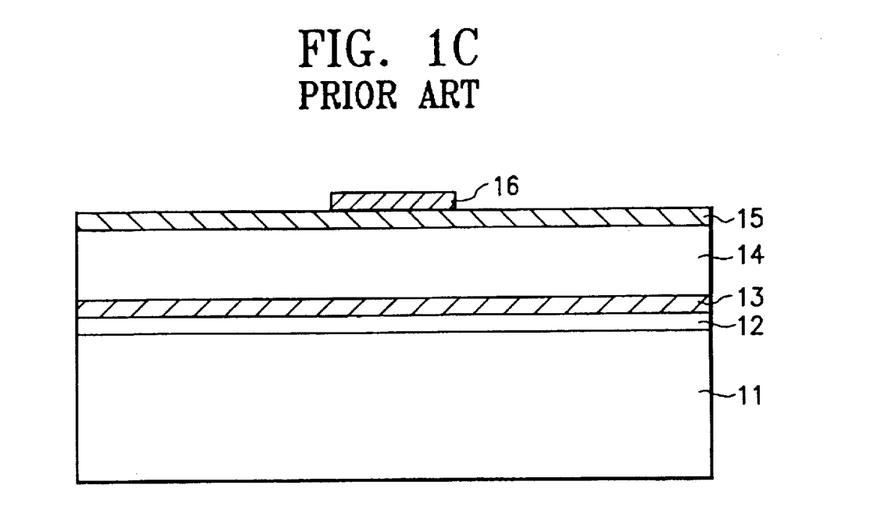
FIG. 1C is a vertical cross-sectional view taken along line A-A' of FIG. 1B.

FIG. 1A is a top view illustrating a Mach-Zehnder interference system modulator of a conventional high molecule electro-optic modulator. FIG. 1B is a top view illustrating a phase modulator of an arm of the modulator. FIG. 1C is a cross-sectional view illustrating a core of a phase modulator/switch.

Generally, the high molecule waveguide polymer electro-optic modulator/switch is formed of a multilayer thin film structure including a lower electrode 12 formed on a silicon substrate 11, a lower cladding layer 13, a waveguide polymer 14, an upper cladding layer 15, and an upper electrode 16.

The lower electrode 12 is formed at the bottom portion of the waveguide polymer 14. The waveguide polymer 14 includes an input terminal and an output terminal which are separated by two lines.

The upper electrode 16 is formed at a line upper portion of the waveguide layer 14 and includes a signal electrode 16a and a bias electrode 16b.

When designing the optical modulator high molecule waveguide polymer, the dissipation ratio of the device, the thickness of the upper and lower cladding layer and the waveguide polymer based on the electrode loss, the driving voltage of the device, and the coupling loss with the optical fiber must be considered.

The optical modulator device is basically designed to operate in the single mode region in order for the device to have a higher dissipation ratio.

In addition, the loss due to the electrode, the driving voltage, the coupling efficiency, etc cannot independently be determined. Namely, there is a predetermined trade-off relationship therebetween.

Variables which are used for controlling the trade-off relationship correspond to the thickness related to the refractive index of each layer.

When the absorption loss due to the electrode is given as a specific value, the structure for optimizing the trade-off relationship of the coupling efficiency and the driving voltage is asymmetrical with respect to the refractive index of the upper and lower cladding layer. The structure has a thickness of the waveguide related to the boundary condition of the single mode condition.

Namely, one of the upper and lower cladding layers has a refractive index similar to the waveguide polymer, and the other one thereof has a lower refractive index.

In addition, the cladding layer of the higher refractive index is made of a high molecule thin film having an electro-optical characteristic as the waveguide polymer.

In such asymmetrical structure, various cladding materials having different refractive indexes are used in accordance with the kinds of the waveguide polymers.

However, since the materials having an optimized refractive index and a characteristic for a better multiple thin film are limited, it is very difficult to select the cladding layer material.

In addition, when the refractive index of each layer is given, the coupling efficiency of the waveguide polymer becomes limited due to the thickness of the waveguide polymer which satisfies the single mode condition.

SUMMARY OF THE INVENTION

Accordingly, it is an object of the present invention to provide a waveguide polymer electro-optic modulator/switch which overcomes the problems encountered in the conventional waveguide polymer electro-optic modulator/switch.

It is another object of the present invention to provide an improved waveguide polymer electro-optic modulator/switch which is capable of improving a driving voltage and a dissipation ratio of a device by increasing a coupling efficiency of a basic mode of a beam incident on a waveguide polymer.

It is another object of the present invention to provide an improved waveguide polymer electro-optic modulator/switch which is operated in a single mode and has an improved device characteristic compared to the optimized modulator/switch and is capable of enhancing the coupling efficiency with an optical fiber without an increase of the driving voltage.

To achieve the above objects, in accordance with a first embodiment of the present invention, there is provided a waveguide polymer electro-optic modulator which includes a waveguide formed in one line, a signal electrode formed at an upper input side of the waveguide, to which signal electrode a signal voltage is applied as an upper electrode, and an absorption electrode formed at an upper portion of the waveguide for absorbing a higher order which is not easily absorbed by the signal electrode and for increasing a dissipation ratio, wherein a waveguide polymer electro-optic modulator comprises a semiconductor substrate on which a lower electrode, a lower cladding layer, a waveguide, an upper cladding layer and an upper electrode are formed.

To achieve the above objects, in accordance with a second embodiment of the present invention, there is provided a waveguide polymer electro-optic modulator which includes a waveguide being divided into two lines between an input side and an output signal, a signal electrode and a bias electrode formed at an upper portion of the thusly divided lines, and an absorption electrode formed in the thusly divided waveguides and at an output upper side of the waveguide for absorbing a higher order which is not easily absorbed by the signal electrode and for increasing a dissipation ratio, wherein a waveguide polymer electro-optic modulator comprises a semiconductor substrate on which a lower electrode, a lower cladding layer, a waveguide, an upper cladding layer and an upper electrode are formed.

To achieve the above objects, in accordance with a third embodiment of the present invention, there is provided a waveguide polymer electro-optic modulator/switch which includes a waveguide being divided into two lines, a signal electrode and a bias electrode formed at an upper portion of the lines of each waveguide, and an absorption electrode formed at the output side of the waveguide for absorbing a higher order which is not easily absorbed by the signal electrode and for increasing a dissipation ratio, wherein a waveguide polymer electro-optic modulator/switch comprises a semiconductor substrate on which a lower electrode, a lower cladding layer, a waveguide, an upper cladding layer and an upper electrode are formed.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limiting of the present invention, and wherein.

DETAILED DESCRIPTION OF THE INVENTION

The modulator/switch according to the present invention, which is operated in a multiple mode region, is directed to improving the operational performance of the device as well as a fabrication process thereof.

The advantages of a device which is operated in a multiple mode of two waveguide polymer systems will now be explained based on a theoretical computation.

First, most of the high molecule electro-optic modulator/switch has a phase modulator/switch structure as shown in FIG. 1C.

Therefore, the optimization of the structure of the electro-optic modulator/switch is made by optimizing the phase modulator/switch structure.

Figure 2A:
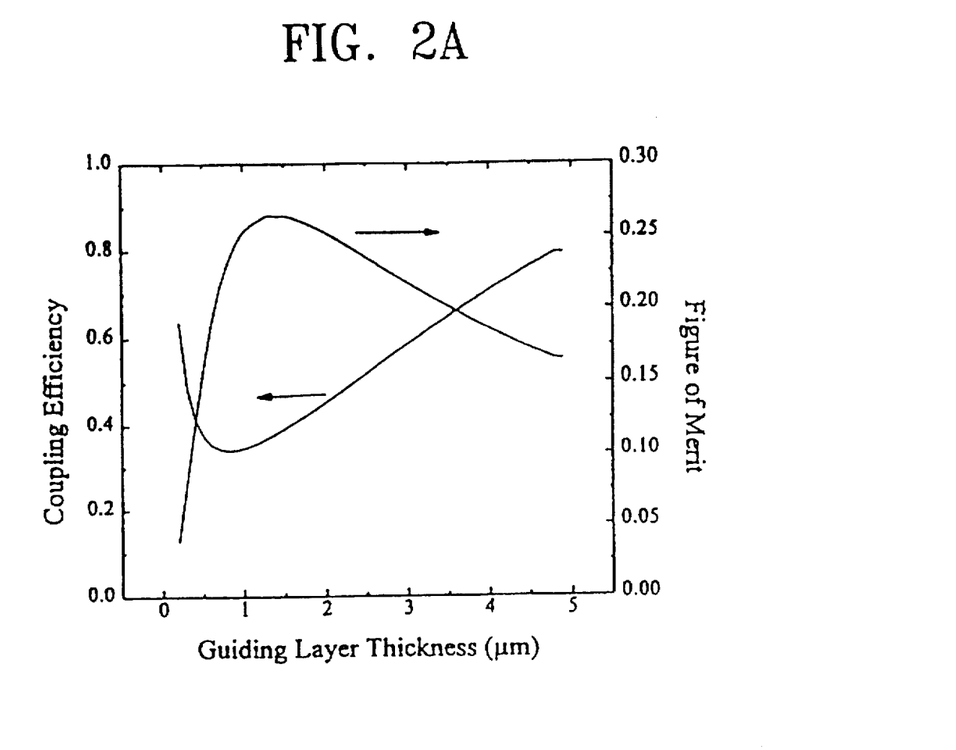
FIGS. 2A and 2B are graphs illustrating the coupling efficiency with respect to a figure of merit (FOM) of a phase modulator based on a thickness of a waveguide polymer and a basic mode of a beam made vertical incident with a diameter of 8 um and a waveguide polymer in two kinds of waveguide structures according to the present invention.
Figure 2B:
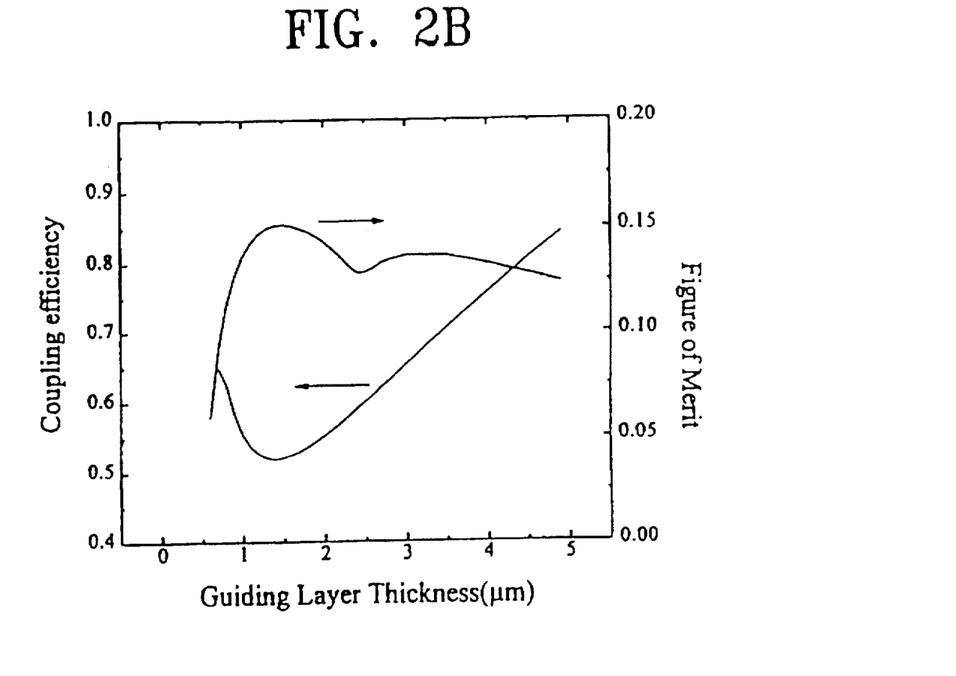

FIGS. 2A and 2B are graphs illustrating the coupling efficiency with respect to a figure of merit (FOM) of a phase modulator based on a thickness of a waveguide polymer and a basic mode of a beam vertically incident with a diameter of 8 um and a waveguide polymer in two kinds of waveguide structures according to the present invention. Here, the wavelength of beam which was used for the computation was 1.3 um.

The FOM as shown in FIGS. 2A and 2B is computed under the condition that the absorption loss of the electrode with respect to the basic mode is fixed to 0.1 dB/cm with respect to the upper and lower electrodes.

The FOM may be expressed as in the following equation (1). The more the FOM is increased, the more the phase variation of the waveguide polymer with respect to the identically supplied voltage is increased. Therefore, the driving voltage of the device is decreased.

$$FOM = (\Delta V/\delta n) d_{tot} \tag{1}$$

where $\delta n$ denotes the amount of the variation of an actual refractive index of a waveguide, and $\delta N$ denotes the amount of the variation of an effective refractive index of a waveguide.

In addition, $d_{tot}$ denotes a total thickness of a waveguide, which is obtained by adding two thicknesses $d_1$ and $d_2$ of the upper and lower cladding layers respectively, and the thickness $d_g$ of the waveguide polymer.

As shown in FIG. 2A, the waveguide polymer is P2ANS (50:50), and the upper and lower cladding layers are all NOA61. In addition, as shown in FIG. 2A, the waveguide polymers are P2ANS (50:50), and the lower cladding layer is P2ANS (35:65), and the upper cladding layer is NOA61.

The P2ANS (x:100-x) denotes a poly (4-dimethylamino-4'-nitro stilbene methacrylate (P2ANS)$_x$-co-methylemthacrylate (MMA)$_{100-x}$)(x:100-x). Namely, it is a non-lineal high molecule thin film of a side-chain group in which a DANS color component is combined to a main chain.

NOA61 denotes an optical epoxy. The intensity of the poling field of two cases is 1.6MV/cm. Here, the refractive index of each layer is as follows: nP2ANS (50:50)=1.7424, and nP2ANS (35:65)=1.6955, and nNOA61=1.543.

As shown in FIG. 2A, in the basic mode boundary in the symmetrical case, the thickness dx is 0–0.8 um. In the first mode boundary, the thickness dx is 1.6 um. In the second mode boundary, the thickness dx is 2.4 um. In the third mode boundary, the thickness is dx is 3.2 um. In the fourth mode boundary, the thickness dx is 4 um. In the fifth boundary, the thickness is 5 um.

Here, only one example was described above. However, the greater the difference of the refractive index between the waveguide and the cladding layer, the better improved the characteristic of the coupling efficiency without a significant variation of the coupling efficiency is.

Namely, when the refractive index of the cladding layer is lower than the waveguide, the thickness of the cladding layer which caused the same electrode loss is made thinner.

As shown in FIG. 2B, in the asymmetrical case, in the basic mode, the thickness dx is 0.6–2.22 um. In the first mode, the thickness dg is 3.8 um. In the second mode, the thickness dg is 5.4 um.

As shown in FIGS. 2A and 2B, in the beginning stage of the mode, the greater the thickness of the waveguide, the more the coupling efficiency is decreased more. Thereafter, the coupling efficiency is increased again. As shown in FIG. 2A, the thickness dg is 0.65 um. As shown in FIG. 2B, the thickness dg is 1.5 um. Namely, the coupling efficiency is increased again after the minimum point.

In the above-described region, since the waveguide beam is not restricted to the waveguide polymer, the FOM of the device is very low as shown in FIGS. 2A and 2B.

Therefore, the thickness of the waveguide must exceed such point for the optimum device design.

As shown in FIG. 2A, the thickness of the waveguide is within 0.6–1.5 um, the greater the thickness of the waveguide the higher the coupling efficiency of the FOM. When the thickness dg exceeds 1.5 um, a trade-off exists between the FOM and the coupling efficiency.

As shown in FIG. 2B, a dip is formed at a thickness of 2.3 um due to a surface plasma induction between the electrode and the lower cladding layer.

As shown in FIG. 2A, as the thickness dg of 1.5 um of the waveguide layer, the maximum FOM remains as a multiple mode region including the basic mode and the first mode. As shown in FIG. 2B, the single mode region remains at a thickness dg of 1.5 um causing the maximum FOM.

However, in the above two cases, at the thickness dg of 1.5 um causing the maximum FOM, the coupling is 0.4 and 0.5, respectively.

Therefore, the thickness of the waveguide layer must be made thicker so as to increase the coupling efficiency. Namely, a mode of a higher order is excited to the waveguide.

As described above, in the structure as shown in FIG. 2A in which the refractive index is high between the waveguide and cladding layer, the waveguide of the multiple mode region has a better coupling efficiency and higher FOM than the single mode region. In addition, in the multiple mode region, there exists a trade-off characteristic of increasing the coupling efficiency within a significant decrease of the HOM.

In addition, the FOM is high compared to the asymmetrical structure as shown in FIG. 2B over the entire region of a thickness of the waveguide layer including the multiple mode region.

In the asymmetrical structure as shown in FIG. 2B, the thickness of the waveguide causing the maximum FOM is in the single region mode; however, since the decrease of the FOM in accordance with the thickness of the waveguide layer is slight, it is possible to obtain a better coupling efficiency in the multiple mode region without a significant decrease of the FOM.

When comparing the symmetrical structure as shown in FIG. 2A and the asymmetrical structure as shown in FIG. 2B, in the symmetrical structure, a higher FOM is obtained in the coupling efficiency compared to the asymmetrical structure.

Namely, in the case of thickness as shown in FIG. 2A, the thickness is 3.5 um, and in the case of thickness as shown in FIG. 2B, when the thickness is 3 um, the coupling efficiency is 0.7.

However, for the FOM concerning such thickness, the coupling efficiency is 0.2. As shown in FIG. 2B, in the case of the symmetrical structure, the FOM is 0.137 which is higher by about 70%.

The advantages of the modulator which is operated in the multiple mode region is obtained on the assumption that the dissipation ratio of the device in the multiple mode region is not decreased.

In order to obtain a higher dissipation ratio, the intensity ratio between the remaining high order modes except for the basic mode at the output terminal of the waveguide and the basic mode must be lower than a specific ratio.

Therefore, the waveguide polymer electro-optic modulator/switch according to the present invention is directed to minimizing the loss with respect to the basic mode and effectively removing the waveguide mode of a higher order excited at the input terminal.

The waveguide polymer electro-optic modulator/switch according to the present invention is directed to removing a high order component of a waveguide. Namely, the loss due to the electrode and the coupling efficiency between the incident beam and the waveguide are controlled as follows:

1) The loss exciting due to the electrode: the processing loss due to the electrode which is one of common characteristics of a waveguide is higher in the TM mode than the TE mode. In the same modes, the higher the order of the mode, the more the loss.

The waveguide polymer electro-optic modulator/switch according to the present invention is basically directed to increasing the electrode loss based on the higher order by a predetermined level rather than the electrode loss inducted with respect to the basic mode by controlling the thickness of the upper and lower buffers, so that it is possible to neglect the intensity of the higher order component at the output terminal compared to the intensity of the basic mode.

2) The loss due to the coupling efficiency: since the mode type of the waveguide incident from the optical fiber is asymmetrical, many mode matches occur with the basic mode of the waveguide. The higher the order, the lower the mode match.

In particular, in the case that the upper and lower cladding layers are symmetrical, the mode coupling efficiency of an odd order is relatively less than the mode of the even order. When the beam is rightly incident on the front of the waveguide of the optical fiber, the coupling efficiency with respect to the higher mode of the waveguide differs in accordance with the input condition of the incident beam.

Therefore, the dissipation characteristic of the device based on the incident condition must be considered.

Figure 3:
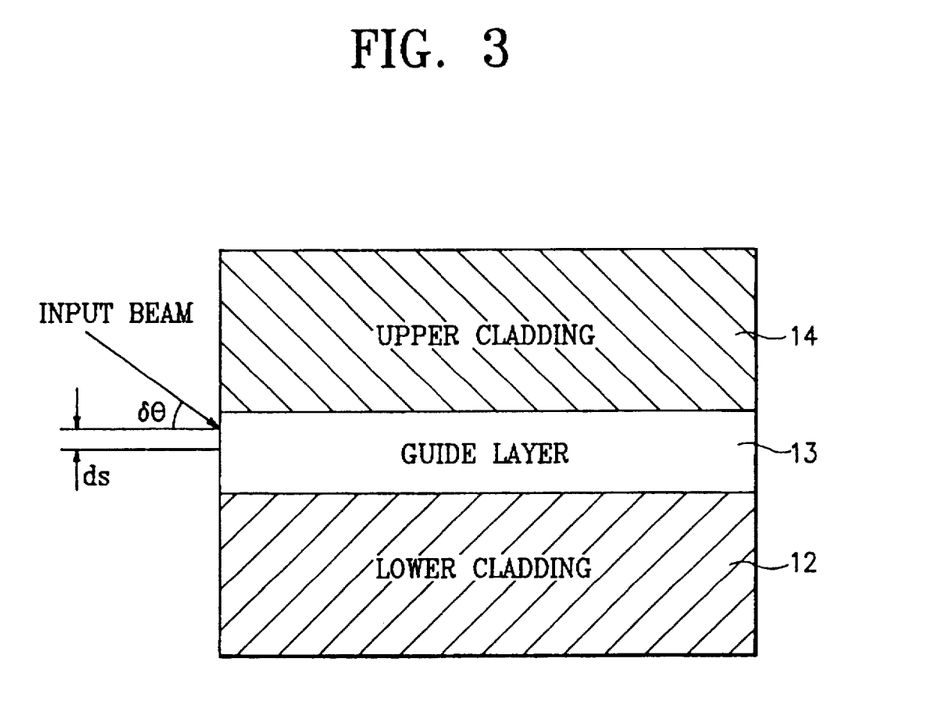
FIG. 3 is a schematic cross-sectional view illustrating a waveguide tilted askew with respect to the center of a waveguide according to the present invention.

FIG. 3 is a schematic cross-sectional view illustrating a waveguide tilted askew by $\delta s$ with respect to the center of a waveguide according to the present invention.

With the above-described two occasions, it is possible to fabricate a device of a higher dissipation ratio by enhancing the coupling efficiency with respect to the basic mode and by controlling the intensity ratio between the basic mode at the output terminal and the remaining higher order modes.

Figure 4A:
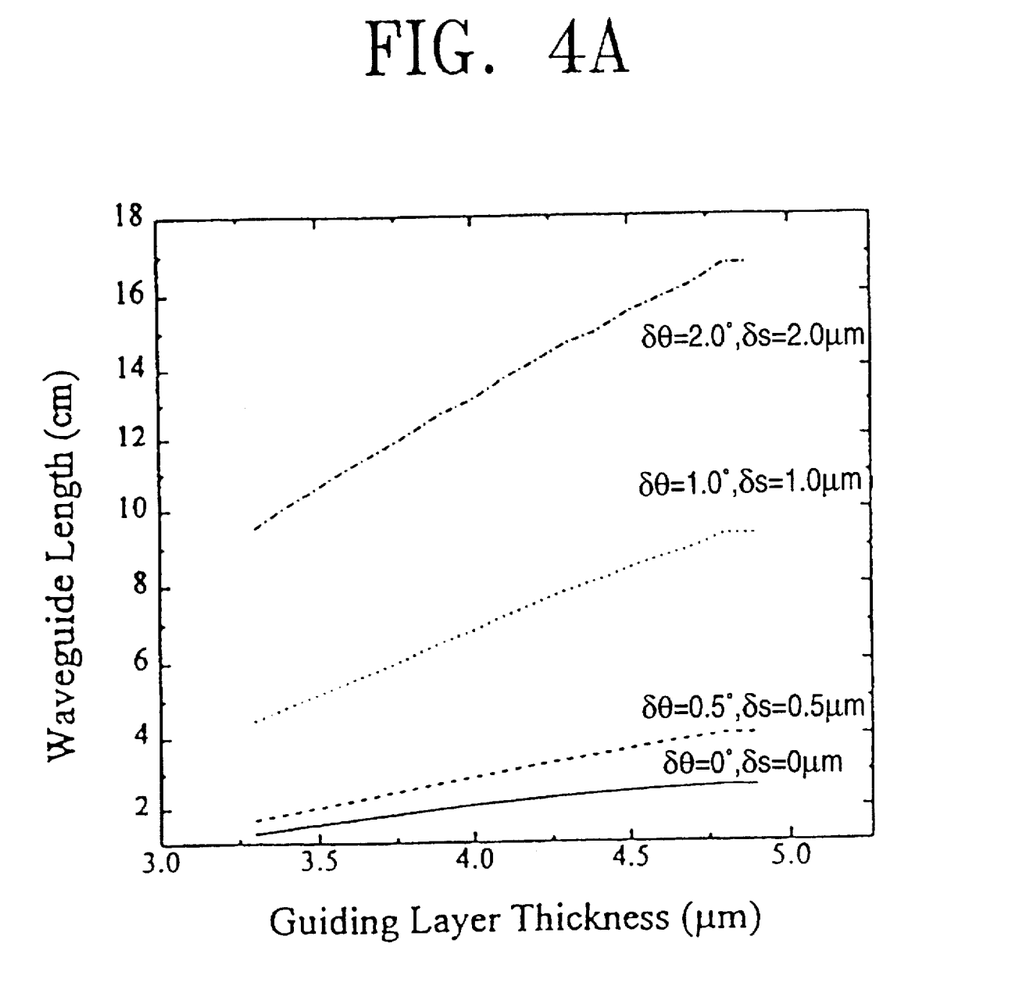
FIGS. 4A and 4B are graphs illustrating a result after computing the conditions of four incident beams having a pair of minimum lengths which are necessary to obtain an intensity between remaining high orders which are higher than 20 dB except for a basic mode in the two waveguide structures of FIGS. 2A and 2B according to the present invention.
Figure 4B:
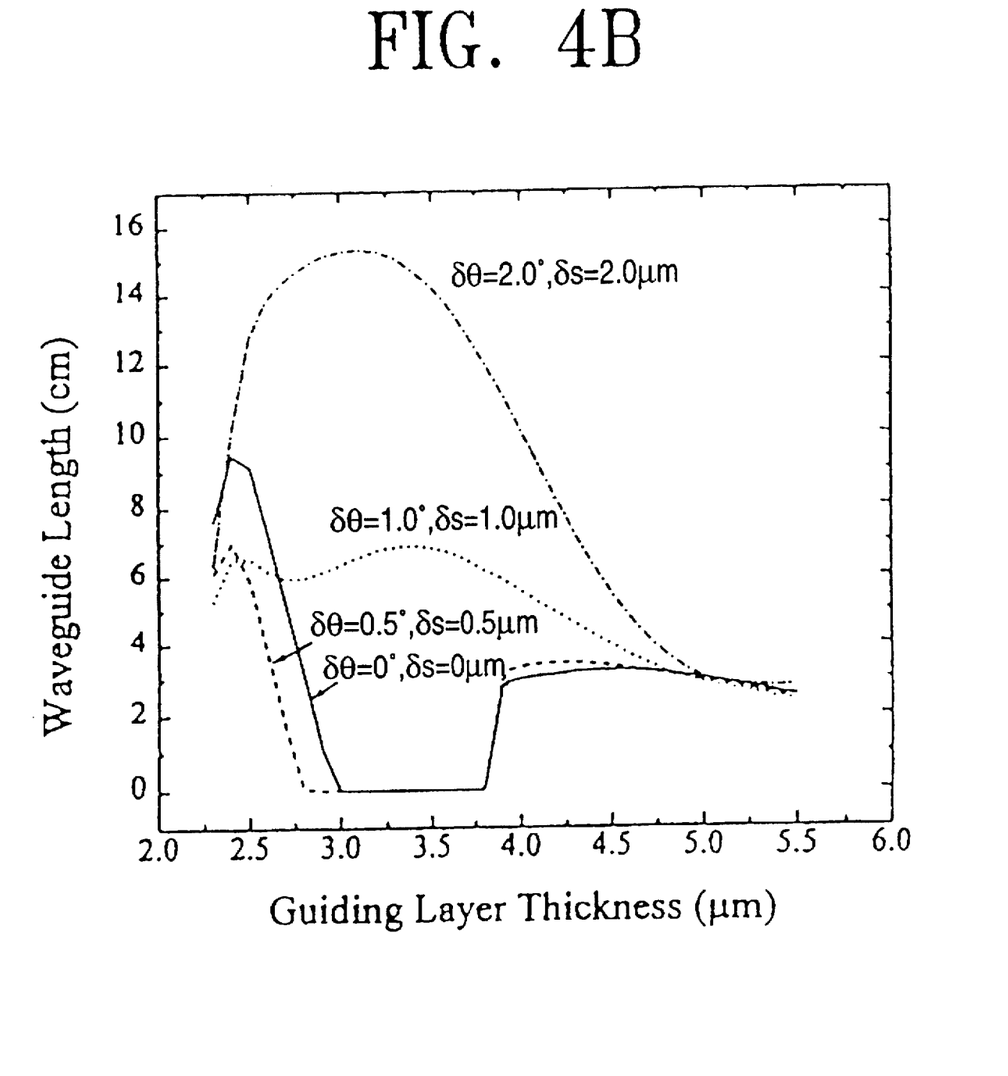

FIGS. 4A and 4B are graphs illustrating a result after computing the conditions of four incident beams having a pair of minimum lengths which are necessary to obtain an intensity between remaining high orders higher than 20 dB except for a basic mode in the two waveguide structures of FIGS. 2A and 2B according to the present invention.

As shown therein, the minimum length L, as shown in FIG. 1B, of the upper and lower electrodes is computed when the intensity difference of all of the higher order mode components except for the basic mode in accordance with the thickness of the waveguide exceeds 20 db when the electrode loss rate of the upper and lower electrodes with respect to the basic mode is fixed to 0.1 dB/cm.

In addition, as shown in FIG. 4A, the thicker the thickness of the waveguide layer and the higher the values of $\delta s$ and $\delta \theta$, the longer the absorption electrode.

For example, when the thickness dr of the waveguide layer is 3.5 um, as shown in FIG. 4A, when the length of the electrode is approximately 1 cm at $\delta s = 0$ um and $\delta \theta = 0°$, approximately 2 cm more is required. When $\delta s = 2.0$ um and $\delta \theta = 2.0°$, the absorption electrode requires a length of about 10 cm.

However, for the actual device and alignment of the optical fiber, it is possible to control $\delta s$ and $\delta \theta$ to be 0.5 um and 0.5°, respectively, and the elongating of the electrode due to an incomplete alignment is not a serious problem.

In the asymmetrical structure as shown in FIG. 4B, when $\delta s$ and $\delta \theta$ are below 0.5 um and 0.5°, respectively, it is possible to obtain a dissipation ratio exceeding 20 dB without the absorption electrode at a region of 3–3.8 um. Namely, it is possible since the ratio between the basic mode and the higher order mode based on the coupling efficiency in such region exceeds 20 dB.

However, when the alignment is not considered, the length of the absorption electrode is made longer.

Figure 5A:
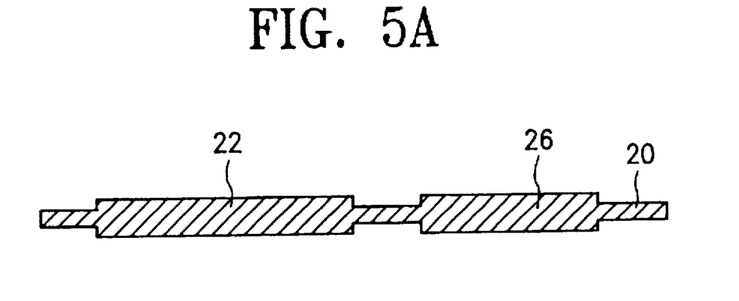
FIGS. 5A through 5C are views illustrating the structure of a waveguide and an electrode of a high molecule electro-optic modulator/switch in a multiple mode region according to the present invention.
Figure 5B:
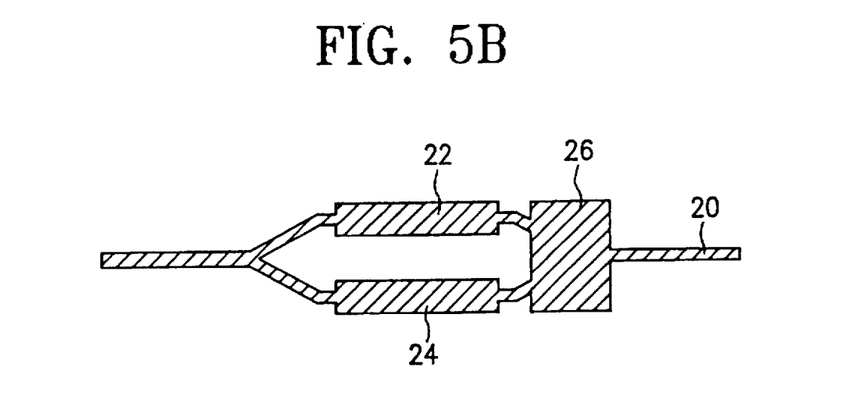
Figure 5C:
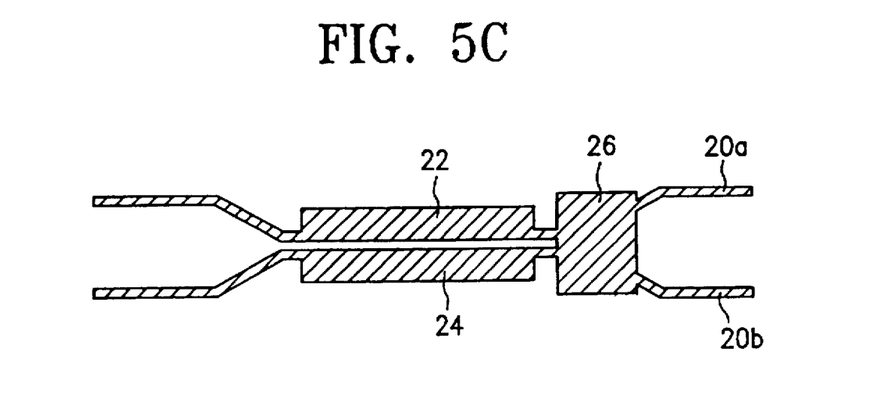

FIGS. 5A through 5C are views illustrating the structure of a waveguide and an electrode of a high molecule electro-optic modulator/switch in a multiple mode region according to the present invention.

As shown therein, the waveguide polymer electro-optic modulator/switch according to the present invention includes a substrate, a lower electrode, a lower cladding layer, a waveguide, an upper cladding layer, and an upper electrode.

As shown in FIG. 5A, the phase modulator according to a first embodiment of the present invention includes a signal electrode 22 at the upper input side of the waveguide 20 which is arranged in one direction and an absorption electrode 26 at the upper output side.

As shown in FIG. 5B, the phase modulator according to a second embodiment of the present invention which is a phase modulator of a Mach-Zehnder interference system includes a signal electrode 22 arranged in a waveguide upper side which is divided into two parts between the input and output and a bias electrode 24. An absorption electrode 26 is arranged at the divided waveguide and the upper portion of the waveguide of the output.

As shown in FIG. 5C, the phase modulator according to a third embodiment of the present invention includes a signal electrode 22 and a bias electrode 24 which are arranged at the upper portion of two waveguides 20a and 20b. An absorption electrode 26 is arranged at the upper output side of the waveguides 20a and 20b.

In particular, the phase modulator/switch according to the third embodiment of the present invention has a wider waveguide at the input and output sides. A portion in which the signal electrode 20a and the bias electrode 20b is narrow.

As shown in FIG. 5A, in the phase modulator, the signal electrode 22 is used as a voltage supplying electrode and absorbs the higher order mode. In case a higher dissipation ratio is not obtained due to the higher order mode absorption dye to the signal electrode, it is possible to increase the dissipation ratio by absorbing the higher mode by using the absorption electrode.

As shown in FIGS. 5B and 5C, the signal electrode absorbs the higher order mode components, and it is possible to increase the dissipation ratio by using the absorption electrode 26.

As described above, the waveguide polymer electro-optic modulator/switch according to the present invention is capable of providing a waveguide which is operated in the multiple mode and is directed to providing a higher dissipation ratio by controlling the electrode loss and the engaging loss with respect to the higher order mode.

In addition, in the same material system, it is possible to form a trade-off between the coupling efficiency and the driving voltage by varying the thickness of the cladding layer and the waveguide. Moreover, it is possible to fabricate a device having a higher coupling efficiency and FOM than the device operating in the single mode region.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A waveguide polymer electro-optic modulator comprising:

a semiconductor substrate on which a lower electrode, a lower cladding layer, a waveguide, an upper cladding layer and an upper electrode are formed, wherein
 the waveguide is formed in one line,
  a signal electrode is formed at an upper input side of the waveguide, to which signal electrode a signal voltage is applied as an upper electrode, and
  an absorption electrode is formed at an upper portion of the waveguide for absorbing a higher order of modes which are not easily absorbed by the signal electrode and for increasing a dissipation ratio.

2. A waveguide polymer electro-optic modulator comprising:

a semiconductor substrate on which a lower electrode, a lower cladding layer, a waveguide, an upper cladding layer and an upper electrode are formed, wherein
 the waveguide is divided into two lines between an input side and an output signal,
  a signal electrode and a bias electrode are formed at an upper portion of the thusly divided lines, and
  an absorption electrode is formed in the thusly divided waveguides and at an output upper side of the waveguide for absorbing a higher order of modes which are not easily absorbed by the signal electrode and for increasing a dissipation ratio.

3. A waveguide polymer electro-optic modulator/switch, comprising:

a semiconductor substrate on which a lower electrode, a lower cladding layer, a waveguide, an upper cladding layer and an upper electrode are formed, wherein
 the waveguide is divided into two lines,
 a signal electrode and a bias electrode are formed at an upper portion of the lines of each waveguide, and
 an absorption electrode is formed at the output side of the waveguide for absorbing a higher order of modes which are not easily absorbed by the signal electrode and for increasing a dissipation ratio.

* * * * *